(12) United States Patent
Sumita

(10) Patent No.: US 8,185,372 B2
(45) Date of Patent: May 22, 2012

(54) APPARATUS, METHOD AND COMPUTER PROGRAM PRODUCT FOR TRANSLATING SPEECH INPUT USING EXAMPLE

(75) Inventor: Kazuo Sumita, Kanagawa (KR)

(73) Assignee: Kabushiki Kaisha Toshiba, Tokyo (JP)

( * ) Notice: Subject to any disclaimer, the term of this patent is extended or adjusted under 35 U.S.C. 154(b) by 838 days.

(21) Appl. No.: 11/519,811

(22) Filed: Sep. 13, 2006

(65) Prior Publication Data

US 2007/0118351 A1    May 24, 2007

(30) Foreign Application Priority Data

Nov. 22, 2005 (JP) ................... 2005-336931

(51) Int. Cl.
*G06F 17/28* (2006.01)

(52) U.S. Cl. .......... 704/2; 704/3; 704/4; 704/9; 704/277

(58) Field of Classification Search .................. 704/2, 9, 704/4, 3, 277; 707/102
See application file for complete search history.

(56) References Cited

U.S. PATENT DOCUMENTS

| | | | | |
|---|---|---|---|---|
| 5,418,716 A | * | 5/1995 | Suematsu | 704/9 |
| 5,963,892 A | * | 10/1999 | Tanaka et al. | 704/2 |
| 6,223,150 B1 | * | 4/2001 | Duan et al. | 704/9 |
| 6,243,669 B1 | * | 6/2001 | Horiguchi et al. | 704/9 |
| 6,278,968 B1 | * | 8/2001 | Franz et al. | 704/3 |
| 6,356,865 B1 | * | 3/2002 | Franz et al. | 704/2 |
| 6,928,448 B1 | * | 8/2005 | Franz et al. | 707/102 |
| 7,536,293 B2 | * | 5/2009 | Zhuo et al. | 704/2 |
| 2003/0036898 A1 | * | 2/2003 | Duan et al. | 704/2 |
| 2004/0122656 A1 | * | 6/2004 | Abir | 704/4 |
| 2004/0167770 A1 | * | 8/2004 | Zhuo et al. | 704/4 |
| 2005/0137853 A1 | * | 6/2005 | Appleby | 704/9 |
| 2005/0267734 A1 | * | 12/2005 | Masuyama | 704/2 |
| 2006/0080079 A1 | * | 4/2006 | Yamabana | 704/2 |
| 2006/0095248 A1 | * | 5/2006 | Menezes et al. | 704/3 |
| 2007/0118351 A1 | * | 5/2007 | Sumita | 704/2 |
| 2007/0198245 A1 | * | 8/2007 | Kamatani et al. | 704/2 |
| 2008/0077262 A1 | * | 3/2008 | Davis | 700/94 |

FOREIGN PATENT DOCUMENTS

JP    5-128150    5/1993

* cited by examiner

*Primary Examiner* — Douglas Godbold
*Assistant Examiner* — Mark Villena
(74) *Attorney, Agent, or Firm* — Finnegan, Henderson, Farabow, Garrett & Dunner, L.L.P.

(57) ABSTRACT

An apparatus includes a first search unit that searches a storage unit for a first example of a first language based on a sentence in the first language; a second search unit that searches for a second example of a second language corresponding to the first example, the second language containing the same meaning as the first example; a determining unit that determines whether a plurality of the second examples exist; a first acquisition unit that acquires the first example corresponding to each of the second example from the storage unit; a second acquisition unit that acquires the second example corresponding to the first example acquired from the storage unit; and a choice generating unit that generates the first example acquired associated with the least number of the second examples acquired as a choice of the first example to be output.

18 Claims, 12 Drawing Sheets

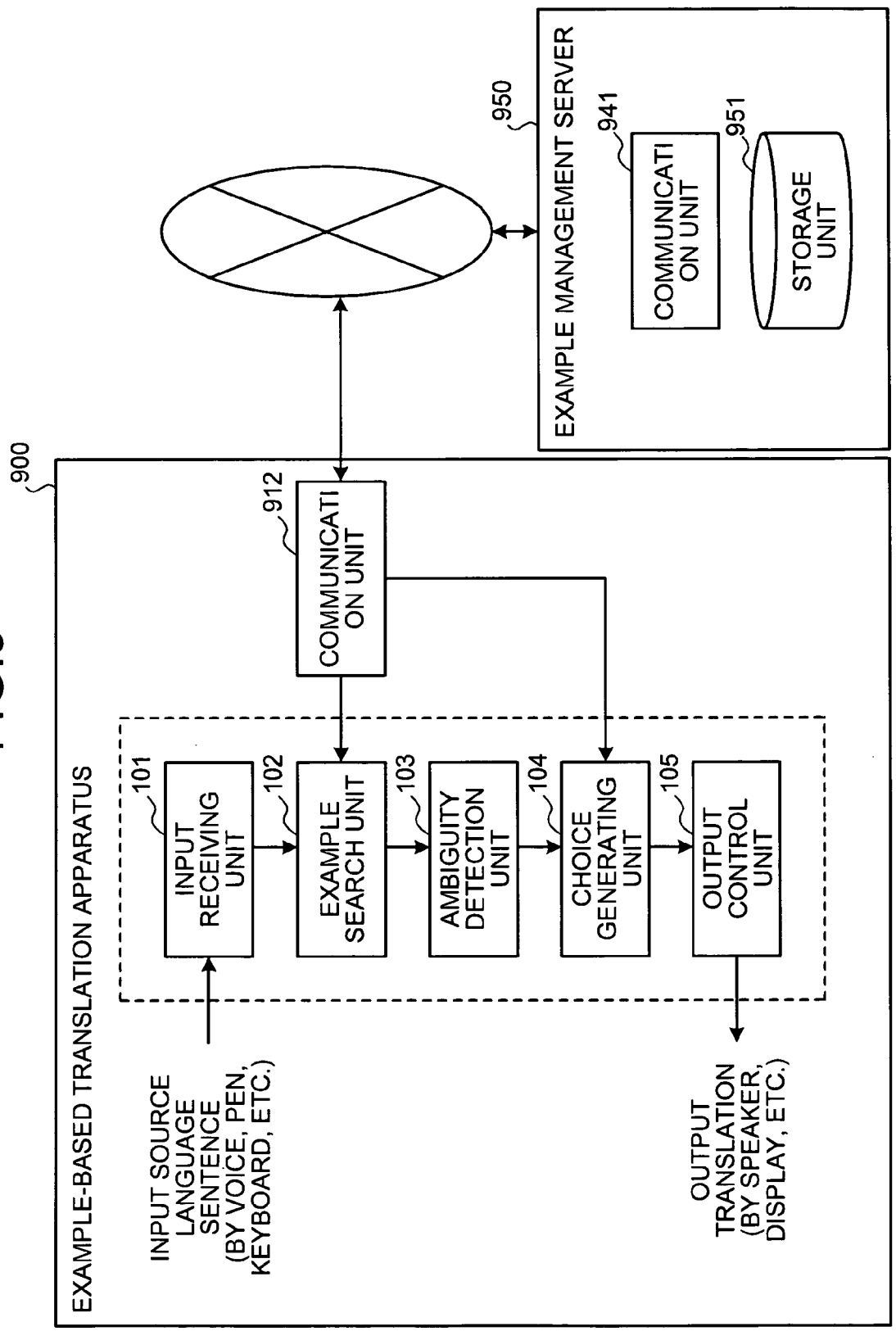

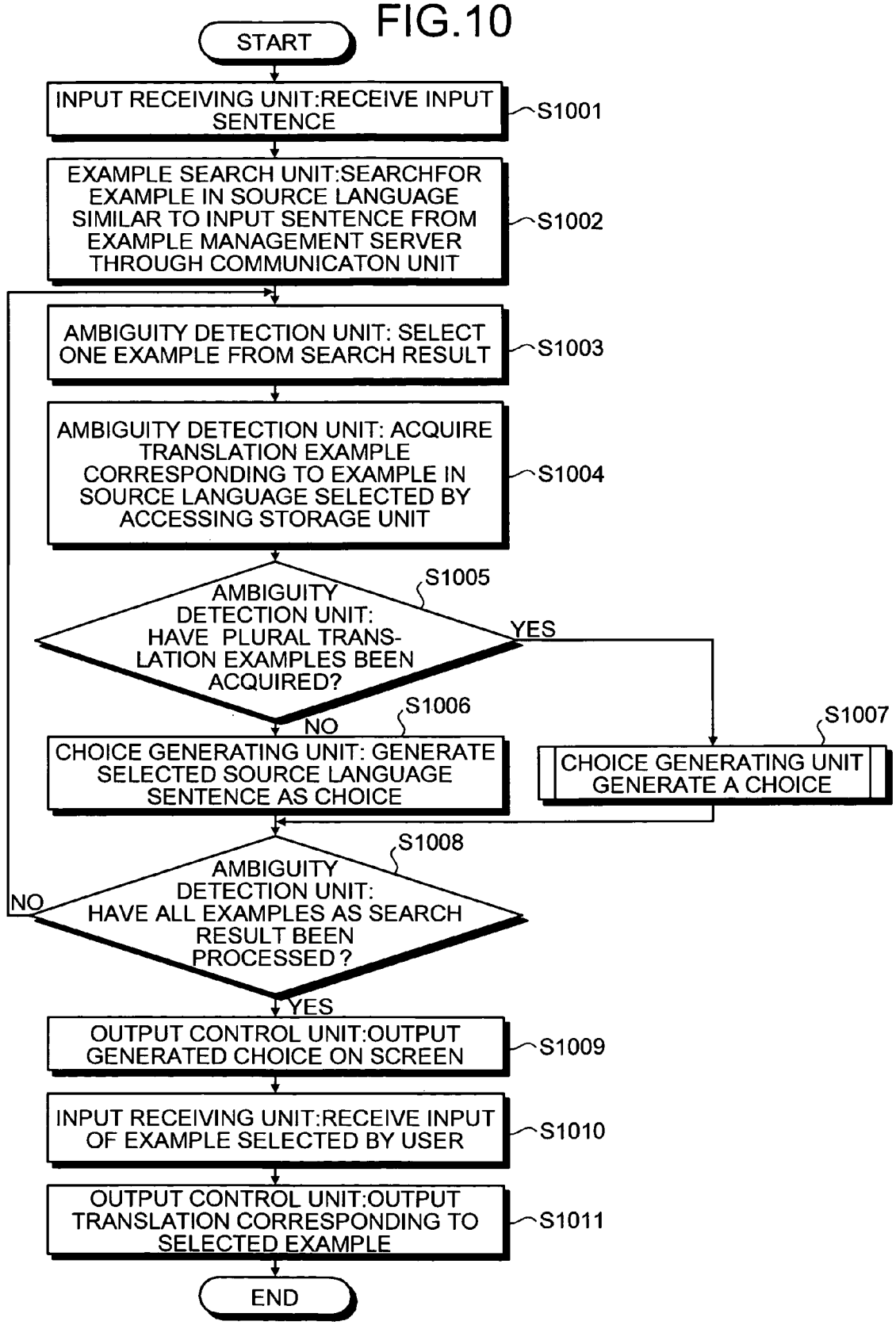

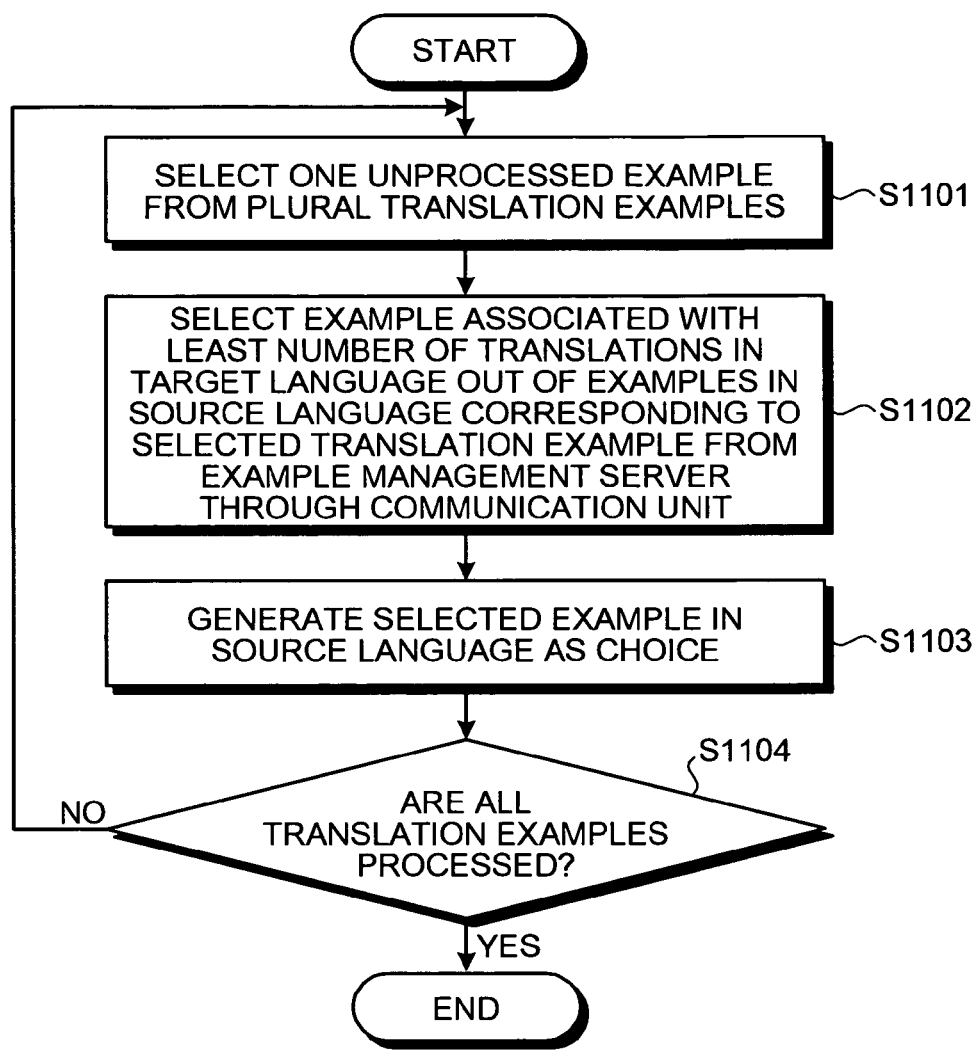

APPARATUS, METHOD AND COMPUTER PROGRAM PRODUCT FOR TRANSLATING SPEECH INPUT USING EXAMPLE

CROSS-REFERENCE TO RELATED APPLICATIONS

This application is based upon and claims the benefit of priority from the prior Japanese Patent Application No. 2005-336931, filed on Nov. 22, 2005; the entire contents of which are incorporated herein by reference.

BACKGROUND OF THE INVENTION

1. Field of the Invention

The present invention relates to an apparatus, a method and a computer program product for translating a speech input using an example and outputting the translation result.

2. Description of the Related Art

In recent years, a speech translation apparatus for supporting the communication between persons speaking different mother tongues has been expected to find practical application. Basically, this speech translation apparatus sequentially executes the speech recognition process, the translation process and the speech synthesis process using a means for recognizing the speech, a means for translating a character string obtained by speech recognition, and a means for synthesizing a speech from the character string obtained by translation.

A speech recognition system for recognizing the speech uttered by the user and outputting the character information is already used for practical purposes in the form of package software or the like. Also, a machine translation system with a written language (text) input thereto similarly finds applications in the form of package software or the like. A speech synthesis system is also in practical use. By appropriately using these software products, a speech translation apparatus can be realized.

Under the circumstances, however, speech recognition 100% in accuracy is difficult to achieve. Even the machine translation of a written language encounters the problem that since a source language may contain the ambiguity of a translation word or dependency, the translation result may not be output as intended. Also, the sentence input by speech is often not grammatically correct, so that the speech is recognized erroneously, resulting in the machine translation of an input containing an error. For these reasons, a speech translation apparatus having a practical value has yet to be realized.

Especially, a speaker of a source language unable to understand a target language cannot confirm whether the speech translation apparatus outputs the translation result as intended by the speaker, and therefore some countermeasure against the error or ambiguity of analysis in speech recognition and machine translation is essential.

The machine translation is the conversion of a sentence in a source language (Japanese, for example) into a target language (English, for example), and according to the conversion scheme, classified roughly into the rule-based machine translation, the statistical machine translation, and the example-based machine translation.

The rule-based translation apparatus includes a morphological analysis unit and a structure parsing unit, in which the sentence structure of the source language is analyzed and based on this structure, converted (transferred) into a sentence structure of the target language. The processing knowledge for structure parsing and transfer are registered in the form of rules in advance, and the translation apparatus executes the translation process by interpreting the rule. Most of the machine translation systems finding applications in package software are of this type.

The rule-based machine translation requires the preparation of a vast amount of rules for realizing a practicable, high-accuracy machine translation. The manual preparation of these rules takes a very high cost. In order to solve these problems, an idea of the statistical machine translation is proposed, and the research and development efforts have since been made vigorously.

In the statistical machine translation, the sentences in a source language and corresponding sentences in a target language are prepared in large scale (called a parallel corpus), and from this corpus, the conversion rule for translation and the probability value thereof are determined. This approach uses conversion rule having the highest probability for translation. Currently, a prototype system of speech translation using the statistical machine translation is constructed.

The example-based machine translation, on the other hand, like the statistical machine translation, uses a parallel corpus of a source language and a target language. The parallel corpus is searched for a sentence in the source language similar to the input sentence, and the sentence in the target language corresponding to the detected sentence in the source language is determined as a translation result. The rule-based machine translation and the statistical machine translation are liable to cause an ambiguity in the application of a conversion rule, with the result that a translation result departing from the intention of the speaker of the source language may be unavoidably output.

The example-based machine translation, in contrast, uses a translation corresponding to the source language sentence detected from the parallel corpus is used as it is, and the source language sentence detected by search can be confirmed by the source language speaker. Also, since the sentences of the target language are prepared manually in advance, the chance of an error occurring in the translation process is comparatively small. Nevertheless, the parallel corpus, though prepared in large scale, cannot cover all the sentences that may be input. In the example-based machine translation, the translation fails if an example similar to the input sentence cannot be retrieved. The example-based machine translation, therefore, is required to be used in complementary fashion with the rule-based machine translation and the statistical machine translation to cover wide applications.

As long as a source language sentence similar to an input sentence can be retrieved from the parallelcorpus in the example-based machine translation, the possibility of correct translation is increased. A given source language sentence, however, is not always accompanied by only one translation, and depending on the situation or context of the conversation, is required to be translated in different way. Specifically, even when an example is prepared manually, the translation may contain an ambiguity. In such a case, a method is available in which the user selects an appropriate one of a plurality of translations proposed. The speaker of the source language who cannot understand the target language, however, is unable to select an appropriate translation.

In view of this, a translation apparatus has been proposed which has the function to display a comment enabling the speaker having no knowledge of the target language to select a correct translation from the source language by displaying the language information on the translation is displayed in the source language (Japanese Patent Application Laid-open (JP-A) No. H05-128150, for example).

Specifically, when an English sentence constituting a source language including a word having a plurality of meanings (usage) is translated into Japanese and a plurality of translation candidates in Japanese are generated, for example, each translation candidate is displayed with a corresponding example of English sentence containing a word of the same usage as in the translation thereof. The speaker then selects an example sentence of the same usage as that of the source language sentence, so that a correct Japanese translation can be selected as a sentence corresponding to the selected example sentence.

In the method disclosed in JP-A No. H05-128150, however, a correct translation is required to be estimated by referring to the language information including the usage, the tense or the aspect (phase) of a word. Thus, the problem is posed that the decision burden is increased for selecting a translation.

Specifically, a plurality of example sentences having a different meaning than intended by the speaker are read and it is determined whether an ambiguity is contained in any part before selecting a correct example sentence. Thus, the decision burden is increased while at the same time posing the problem of a longer processing time required before selecting and proposing a correct translation to the other party.

SUMMARY OF THE INVENTION

According to one aspect of the present invention, an example-based translation apparatus includes a storage unit that stores an example of a first language and an example of a second language containing the same meaning as the example of the first language, the examples being associated with each other; an input receiving unit that receives an input of a sentence in the first language; a first example search unit that searches the storage unit for a first example of the first language based on the sentence in the first language; a second example search unit that searches for a second example of the second language corresponding to the first example; a determining unit that determines whether a plurality of the second examples exist or not; a first acquisition unit that acquires a third example of the first language corresponding to each of the plurality of the second examples from the storage unit, when the determining unit determines that the plurality of the second examples of the second language exist; a second acquisition unit that acquires a fourth example of the second language corresponding to the third example from the storage unit; a choice generating unit that generates a choice of the third example associated with the least number of the fourth examples; and an output control unit that outputs the choice of the third example.

According to another aspect of the present invention, an example-based translation apparatus includes a communication unit that transmits a sentence in a first language, an example of the first language, or an example of a second language to an example management server connected to the communication unit through a network, and receives an example of the first language or the example of the second language returned from the example management server, the example management server having a storage unit that stores the example of the first language and the example of the second language containing the same meaning as the example of the first language in association with each other; an input receiving unit that receives an input of a sentence in the first language; a first example search unit that searches the storage unit of the example management server for a first example of the first language through the communication unit based on the sentence in the first language; a second example search unit that searches the storage unit of the example management server for a second example of the second language corresponding to the first example through the communication unit; a determining unit that determines whether a plurality of the second examples exist or not; a first acquisition unit that acquires a third example of the first language corresponding to each of the second examples from the storage unit through the communication unit, when the determining unit determines that a plurality of the second examples exist; a second acquisition unit that acquires the fourth example of the second language corresponding to the third example from the storage unit through the communication unit; a choice generating unit that generates a choice of the third example associated with the least number of the fourth examples; and an output control unit that outputs the choice of the third example.

According to still another aspect of the present invention, an example-based translation method includes receiving an input sentence in a first language; searching, for a first example of the first language, a storage which stores the example of the first language and an example of a second language having the same meaning as the example of the first language in association with each other based on the sentence in the first language; searching for a second example of the second language corresponding to the first example; determining whether a plurality of the second examples exist or not; acquiring a third example of the first language corresponding to each of the second examples from the storage unit, when it is determined that a plurality of the second examples exist; acquiring the fourth examples of the second language corresponding to the third example from the storage unit; generating a choice of the third example associated with the least number of the fourth examples; and outputting the choice of the third example.

According to still another aspect of the present invention, an example-based translation method includes receiving an input sentence in a first language; searching a storage unit of an example management server through a communication unit for a first example of the first language based on the sentence in the first language, the communication unit transmitting a sentence in the first language, an example of the first language, or an example of a second language having the same meaning as the example of the first language to the example management server, and receiving the example of the first language or the example of the second language returned by the translation example management server, the translation example management server being connected through a network, and having a storage unit storing the example of the first language and the example of the second language in correspondence with each other; searching the storage unit of the example management server for a second example of the second language corresponding to the first example through the communication unit; determining whether a plurality of the second examples exist or not; acquiring a third example corresponding to each of the second examples from the storage unit through the communication unit, when it is determined that a plurality of the second examples exist; acquiring the fourth example of the second language corresponding to the third example from the storage unit through the communication unit; generating a choice of the third example associated with the least number of the fourth examples; and outputting the choice of the third example.

According to still another aspect of the present invention, a computer program product causes a computer to perform any one of methods according to the present invention.

BRIEF DESCRIPTION OF THE DRAWINGS

FIG. 9 is a block diagram showing a configuration of an example-based translation apparatus according to a third embodiment;

FIG. 10 is a flowchart showing a general flow of the example-based translation process according to the third embodiment; and FIG. 11 is a flowchart showing a general flow of the choice generating process according to the third embodiment.

DETAILED DESCRIPTION OF THE INVENTION

Exemplary embodiments of an example-based translation apparatus, an example-based translation method and an example-based translation program according to the present invention are described in detail below with reference to the accompanying drawings.

An example-based translation apparatus according to a first embodiment presupposes the use of a parallel corpus having stored therein examples in a source language sentences and corresponding translation examples in a target language in many-to-many relation, and when a plurality of translation examples exist for a source language sentence input, a less ambiguous one of the examples in the source language sentences corresponding to the translation examples in the target language is proposed to the user as a choice.

The description that follows assumes that the translation process is executed with Japanese as a source language and English as a target language of translation. Nevertheless, the source language and the target language may be any combination of other languages.

Figure 1:
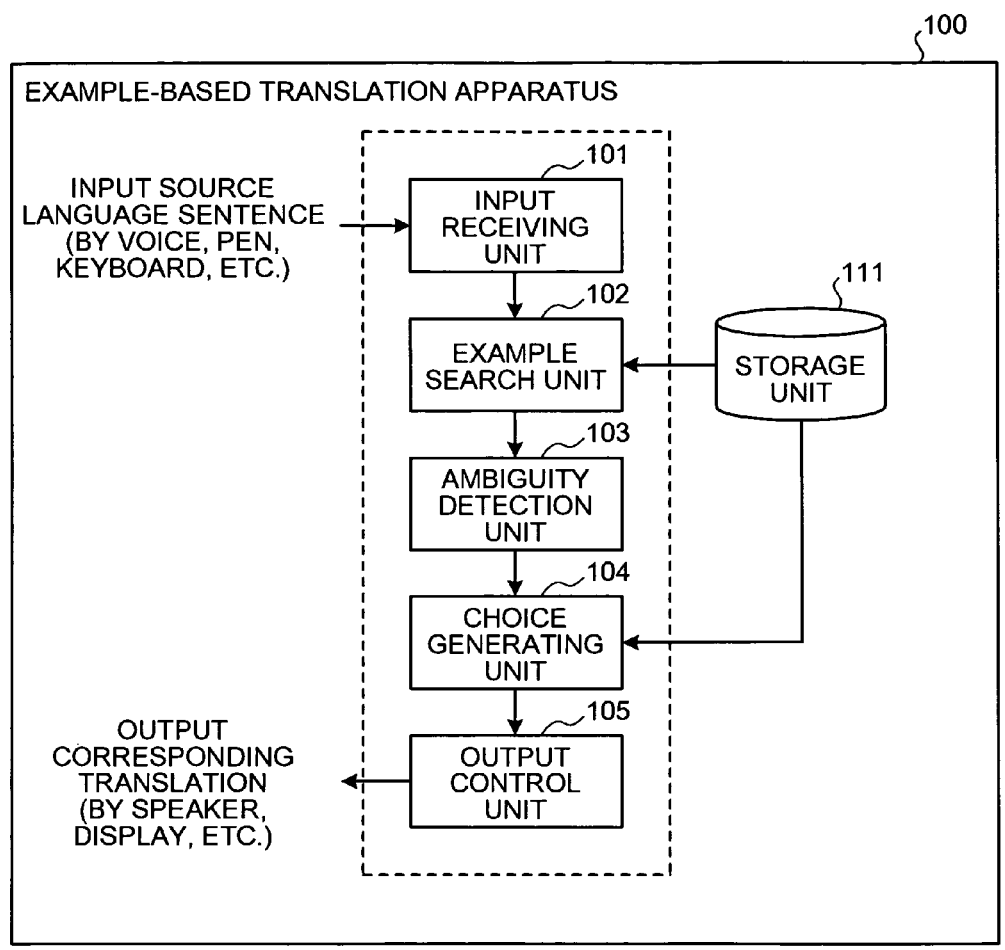
FIG. 1 is a block diagram showing a configuration of an example-based translation apparatus according to a first embodiment.

FIG. 1 is a block diagram showing a configuration of an example-based translation apparatus 100 according to the first embodiment. As shown in FIG. 1, the example-based translation apparatus 100 includes a storage unit 111, an input receiving unit 101, an example search unit 102, an ambiguity detection unit 103, a choice generating unit 104, and an output control unit 105.

The storage unit 111 is for storing examples of sentences and phrases in the source language and translation examples corresponding to the examples in the source language sentence, and may be configured of any storage medium generally used including an HDD (hard disk drive), an optical disk, a memory card or a RAM (random access memory).

Figure 2:
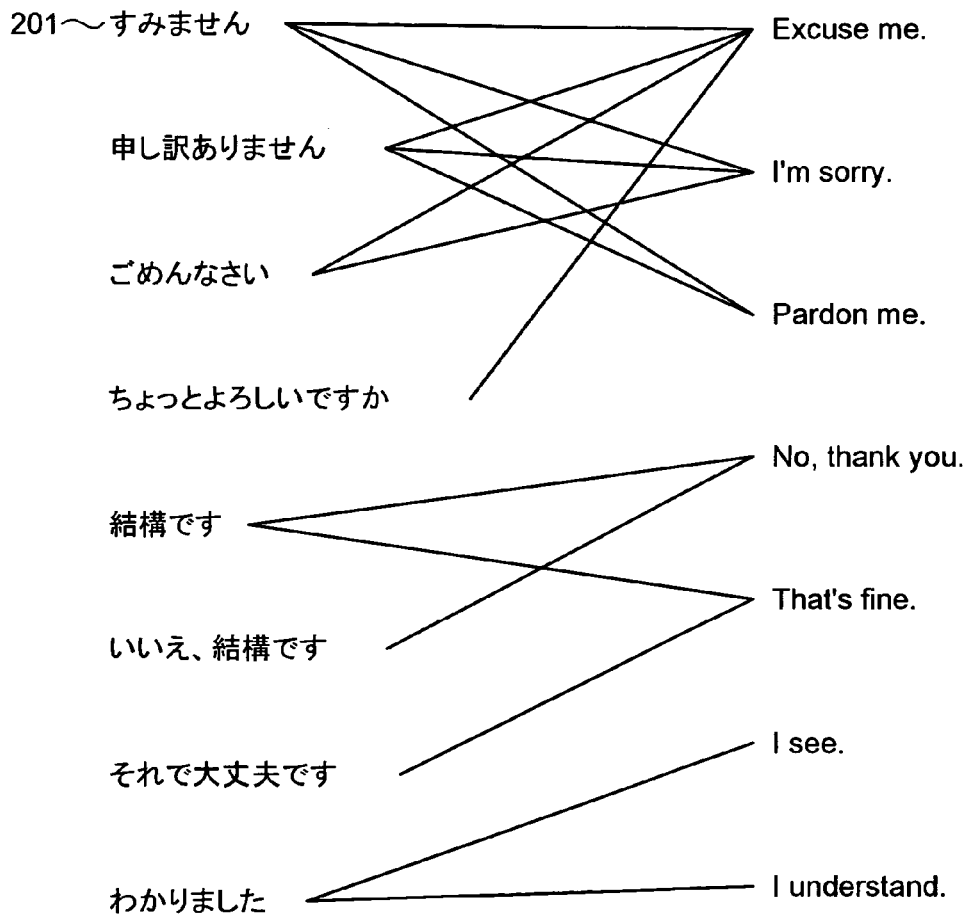
FIG. 2 is a schematic diagram illustrating an example of the data structure of a parallel corpus stored in a storage unit.

FIG. 2 is a schematic diagram illustrating an example of the data structure of the parallel corpus stored in the storage unit 111. As shown in FIG. 2, the storage unit 111 has stored therein an example in Japanese and a corresponding example in English having the same meaning as the example in Japanese. The straight lines connecting the examples in Japanese and the examples in English indicate the correspondence.

When a plurality of examples in English having the same meaning as an example in Japanese exist, the plurality of the examples in English are connected to the example in Japanese having the same meaning by a plurality of straight lines starting with the example in Japanese to indicate correspondence. In similar fashion, when there are a plurality of examples in Japanese having the same meaning as an example in English, the example in English is set in correspondence with the examples in Japanese by a plurality of straight lines starting with the examples in Japanese. In this way, examples in Japanese and examples in English are set in correspondence with each other in many-to-many relation.

When an input sentence is in Japanese, the source language is Japanese, and an example in English corresponding to the example in Japanese constitutes a translation in the target language. When an input sentence is in English, on the other hand, the source language is English and an example in Japanese related to the example in English constitutes a translation in the target language. Specifically, the source language and the target language are relative to each other and depend on the direction of translation. To facilitate the understanding, the Japanese-English translation is presupposed in the drawings and description. Nevertheless, a similar process is executed also for the English-Japanese translation to implement the example-based translation apparatus according to this embodiment.

The input receiving unit 102 is for receiving the source language sentence input by the user using a keyboard, a mouse, a button or the like input device. Also, the input of an example is received as selected by the user from the choices of examples output from the output control unit 105 described later.

The translation apparatus according to the invention may further include a speech recognition unit (not shown) for receiving the speech in the source language input through a microphone or the like, aurally recognizing the received speech and outputting the speech recognition result, in which the input receiving unit 101 receives the speech recognition result output from the speech recognition unit as a source language sentence.

Also, the translation apparatus may further include a character recognition unit (not shown) for receiving the character information in the source language input from a pen input device or the like, recognizing the characters of the character information received and outputting the character recognition result, in which the input receiving unit 101 receives the character recognition result output from the character recognition unit as a source language sentence.

The example search unit 102 is for searching the storage unit 111 for an example coincident or similar to the source language sentence received by the input receiving unit 101. A similar example is also searched for by reason of the fact that the retrieval of only an example completely coincident with the input sentence cannot effectively utilize a semantically similar example. Nevertheless, only an example completely coincident may be retrieved.

The example search unit 102 calculates the edit distance dist of a word string defined in Equation (1) below and searches for an example with the edit distance dist not exceeding a predetermined threshold value.

$$\text{dist}=(I+D+2\Sigma\text{SEMDIST})/(L\text{input}+L\text{example}) \quad (1)$$

where Linput is the number of words constituting the input sentence, Lexample is the number of words constituting an example in the source language sentence, I is the number of words inserted, D is the number of words deleted, and SEMDIST is the semantic distance of a substitute word.

The method of searching for a similar example is not limited to the method described above, but any method for searching for an example having similar contents to the input sentence can be used.

The ambiguity detection unit 103 refers to the translation relation stored in the storage unit 111 and detects the existence of ambiguity of the translation of an example in the source language. Specifically, the ambiguity detection unit 103 detects whether the translation is ambiguous or not by determining whether there are a plurality of examples of the translation set in correspondence with the example in the source language retrieved by the example search unit 102.

When the example search unit 102 searches for a Japanese 201 shown in FIG. 2, for example, three corresponding examples of English translation exist and therefore the existence of ambiguity of the translation of the example in the source language is determined.

The choice generating unit 104, upon detection of the ambiguity of the translation of an example in the source language sentence by the ambiguity detection unit 103, generates a choice of example of the source language sentence proposed to the user to output an optimum translation.

Specifically, first, when the ambiguity detection unit 103 detects the presence of a plurality of examples of translation, the choice generating unit 104 acquires from the storage unit 111 an example in the source language corresponding to each of a plurality of the translation examples. Next, the choice generating unit 104 acquires from the storage unit 111 a translation example corresponding to the acquired example of the source language sentence. Finally, the choice generating unit 104 generates, as a choice, an example of the source language sentence associated with the least number of the acquired translation examples.

The output control unit 105 is for outputting an example choice generated by the choice generating unit 104 to the user. The input receiving unit 101, upon receipt of the input of an example selected by the user, outputs the corresponding translation to the user (the other party of dialogue).

In the output control unit 105, an example choice of the source language sentence generated or the translation in the target language is output to the display device for displaying a character string on the screen.

The translation apparatus according to the invention may further include a speech synthesis unit (not shown) for synthesizing the translation into a speech in the target language, and the output control unit 105 outputs the speech in the target language synthesized by the speech synthesis unit.

Figure 3:
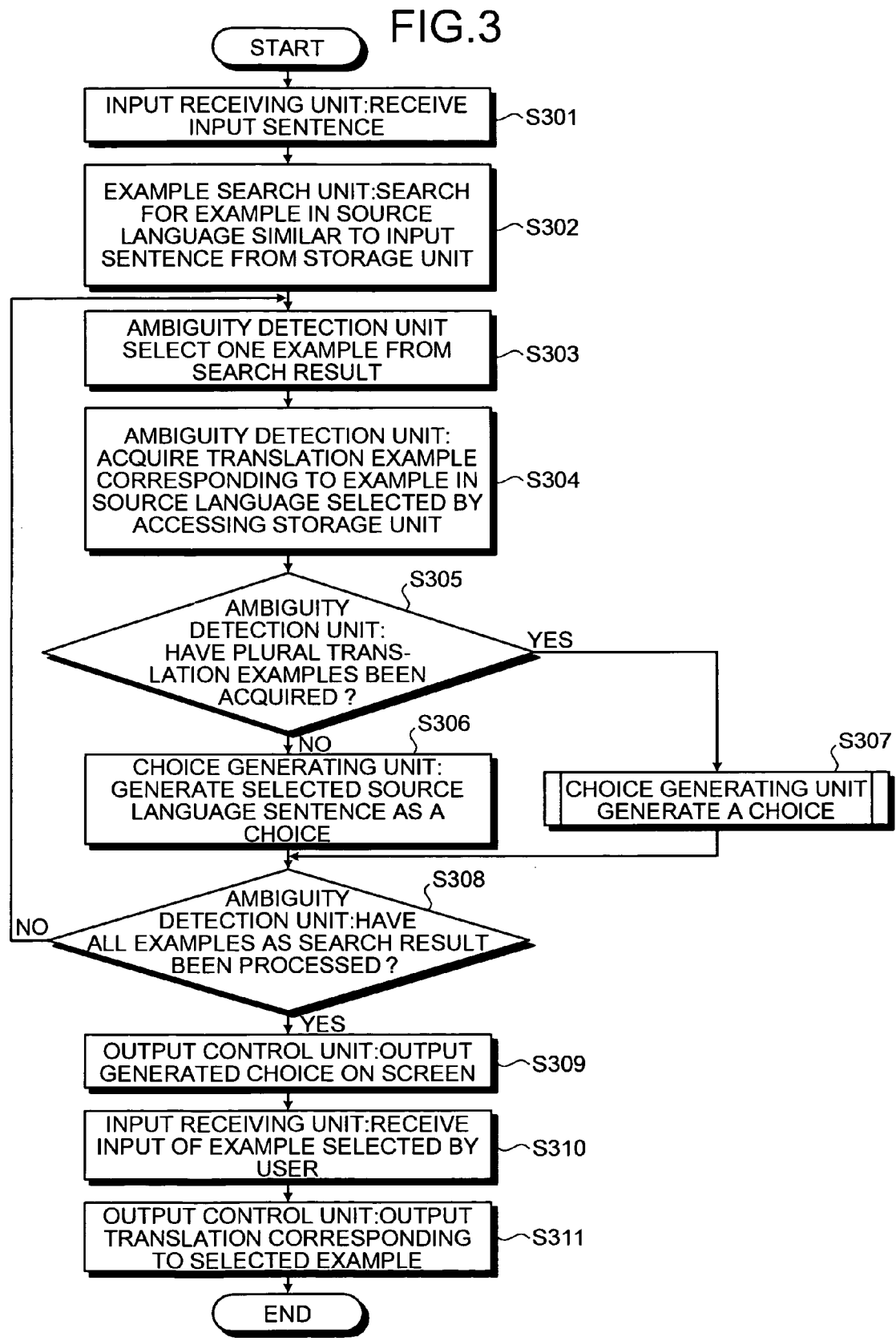
FIG. 3 is a flowchart showing a general flow of the example-based translation process according to the first embodiment.

Next, an example-based translation process executed by the example-based translation apparatus 100 according to the first embodiment having the aforementioned configuration is explained. FIG. 3 is a flowchart showing a general flow of the example-based translation process according to the first embodiment.

First, the input receiving unit 101 receives an input sentence in the source language from the user (step S301). Next, the example search unit 102 searches for an example of the source language sentence coincident or analogous to the input sentence from the storage unit 111 (step S302).

Normally, a plurality of examples are searched for, and each of the examples is subjected to the process described below. When no example is searched for at step S302, on the other hand, a translation failure is notified by output and an input is received anew.

First, the ambiguity detection unit 103 selects one of the examples from the search result (step S303). Next, the ambiguity detection unit 103 acquires a translation example corresponding to the selected example from the storage unit 111 (step S304).

Then, the ambiguity detection unit 103 determines whether a plurality of translation examples are acquired or not (step S305), and when a plurality of translation examples are not acquired (NO at step S305), generates the example of the source language sentence selected by the choice generating unit 104 as a choice (step S306).

When a plurality of translation examples are acquired (YES at step S305), on the other hand, the choice generating process is executed to generate a choice of an example of the source language sentence which permits selection of the most optimum one of a plurality of the translation examples (step S307). The choice generating process is described in detail later.

Next, the ambiguity detection unit 103 determines whether all the examples searched for are processed or not (step S308), and when all the examples searched for are not processed (NO at step S308), the next example is selected and the process is repeated (step S303).

When all the examples searched for are processed (YES at step S308), on the other hand, the output control unit 105 outputs choices of the examples generated by the choice generating unit 104 to the screen (step S309).

Next, the input receiving unit 101 receives the input of the example selected by the user from the choices of the examples output on the screen (step S310). The output control unit 105 then acquires a translation corresponding to the example selected by the user and outputs it on the screen (step S311).

Figure 4:
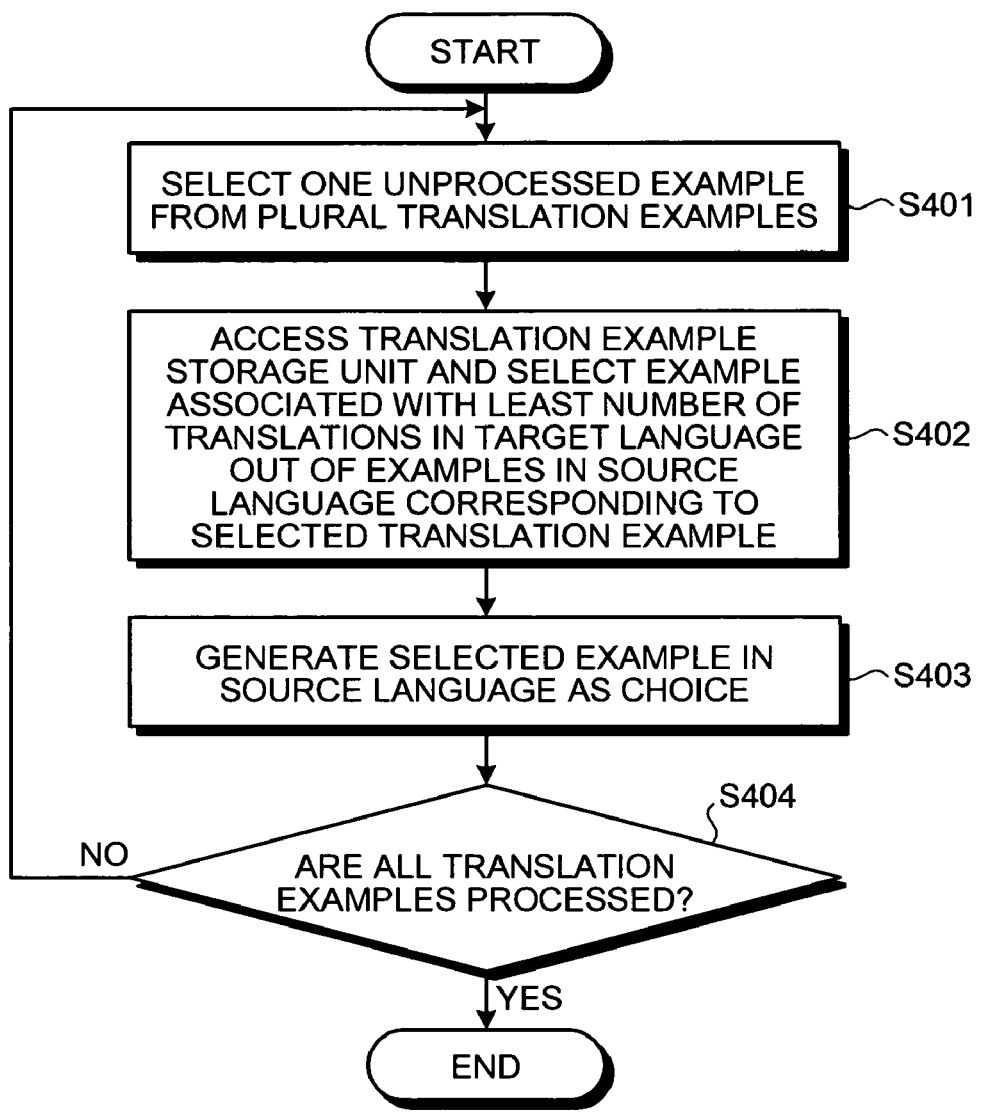
FIG. 4 is a flowchart showing a general flow of the choice generating process according to the first embodiment.

The choice generating process of step S307 is explained in detail. FIG. 4 is a flowchart showing a general flow of the choice generating process according to the first embodiment.

First, the choice generating unit 104 selects one example of the unprocessed translation from a plurality of translation examples (step S401). Next, the choice generating unit 104, accessing the storage unit 111, selects one of the examples of the source language sentences corresponding to the selected translation examples, which is associated with the least number of translations in the target language (step S402).

When there are a plurality of examples of the source language sentences associated with the least number of translation examples, an example high in a predetermined order of priority is selected, for example, in the storage in the storage unit 111.

Next, the choice generating unit 104 generates the selected example of the source language sentence as a choice of an example (step S403). The choice generating unit 104 determines whether all the translation examples are processed or not (step S404). When all the translation examples are not processed (NO at step S404), the next translation example is selected, and the process is repeated (step S401).

When all the translation examples are processed (YES at step S404), on the other hand, the choice generating process is completed.

Figure 5A:
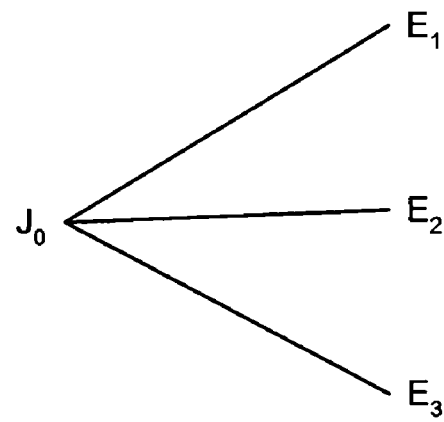
FIGS. 5A and 5B are diagrams illustrating an example of the relation between an example of usage in a source language sentence and an example of the usage of a corresponding translation.
Figure 5B:
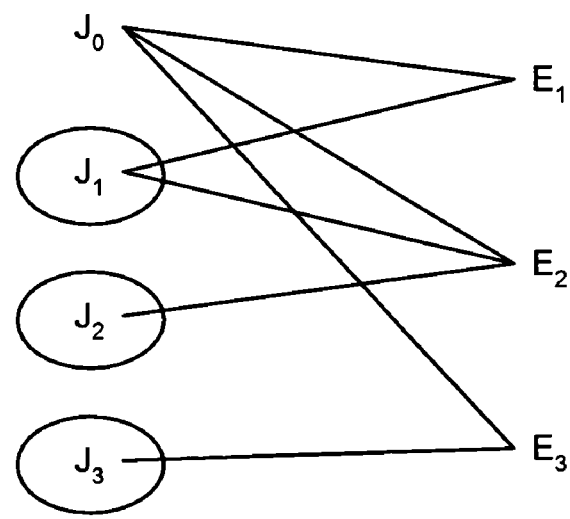

Next, a specific example of the ambiguity detection process (step S305) executed by the ambiguity detection unit 103 and the choice generating process (step S307) executed by the choice generating unit 104 is explained. FIGS. 5A and 5B are diagrams illustrating an example of the relation between an example of the source language sentence and a translation example referred to in the ambiguity detection process and the choice generating process.

FIG. 5A shows an example in which an example j0 of the source language sentence corresponds to three examples e1, e2, and e3 of the target language sentence. When there are a plurality of examples in the target language corresponding to the retrieved source language sentence as described here, it indicates that the translation of j0 is ambiguous. Specifically, the ambiguity detection unit 103 can detect the ambiguity of the translation of the source language sentence by determining whether one or a plurality of examples of the target language sentences correspond to the example of the source language sentence (step S305).

FIG. 5B shows an example in which the example j0 of the source language sentence corresponds to three examples e1, e2, and e3 in the target language, while the examples e1, e2, and e3 in the target language correspond to four examples j0, j1, j2, and j3 of the source language sentence the other way around.

The choice generating unit 104 generates a choice by analyzing the translation relation shown in FIG. 5B. Specifically, an example of the source language sentence associated with the least number of corresponding examples in the target language is extracted, and the extracted example of the source language sentence is generated as a choice.

As shown in FIG. 5B, for example, there are three example candidates e1, e2, and e3 of the target language corresponding to the example j0 of the source language sentence. With regard to the example e1 of the target language, it corresponds to examples j0 and j1, of which j0 corresponds to three examples e1, e2, and e3 of the target language, while j1 corresponds to two examples e1 and e2 of the target language. In this case, the example j1 is least in ambiguity and selected (step S402).

Also, with regard to the example e2 of the target language, it corresponds to examples j0, j1, and j2. The example j0 corresponds to the three examples e1, e2, and e3 of the target language, the example j1 corresponds to the two examples e1 and e2 of the target language, and the example j2 corresponds to only one example e2 of the target language. In this case, the correspondence of j2 has the least ambiguity, and therefore the example j2 is extracted (step S402).

Further, with regard to the example e3 of the target language, it corresponds to the examples j0 and j3. The example j0 corresponds to three examples e1, e2, and e3 of the target language, and the example j3 corresponds to one example e3 of the target language. In this case the example j3 is least in ambiguity and therefore extracted (step S402). In this way, the examples j1, j2, and j3 are generated as choices (step S403).

Figure 6A:
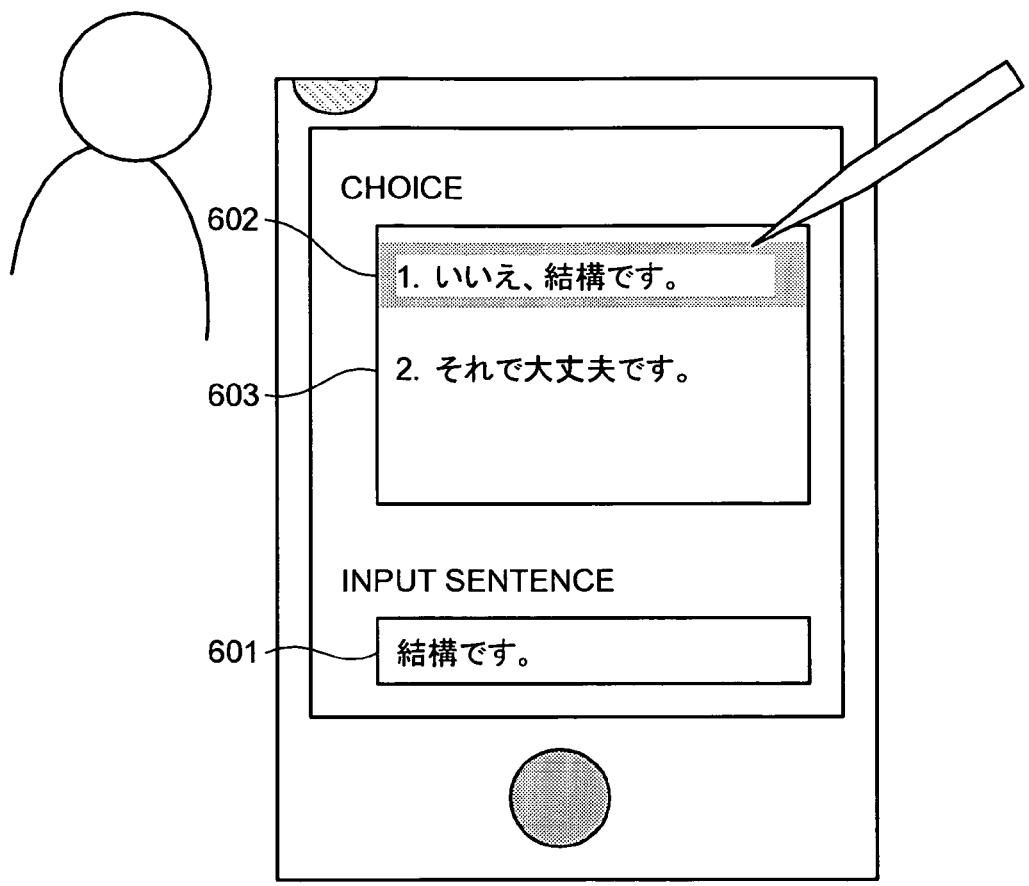
FIGS. 6A and 6B are schematic diagrams showing an example of the contents of a display screen.
Figure 6B:
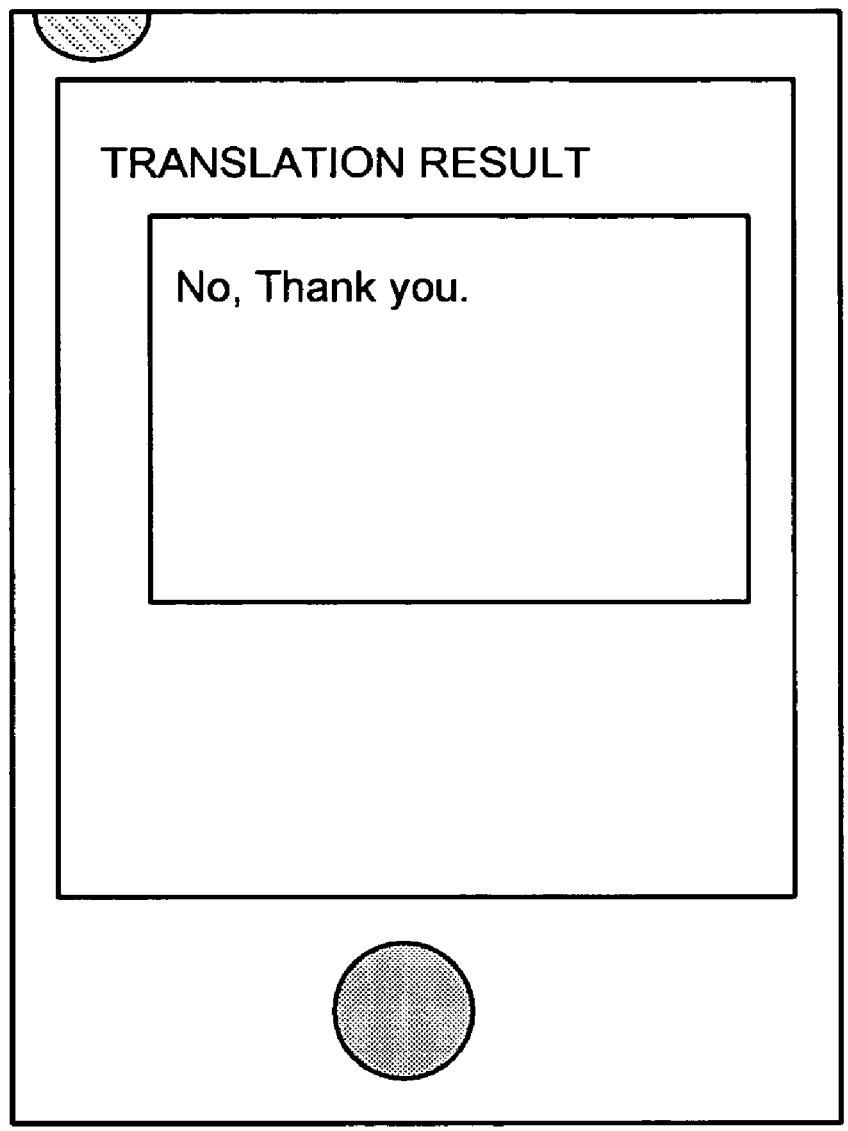

Next, the display screen for displaying the input sentence, and the choices generated is explained. FIGS. 6A and 6B are schematic diagrams showing an example of the contents of the display screen. FIG. 6A shows an example of the display screen on which the input sentence and the choices of examples are displayed, and FIG. 6B an example of the display screen on which the translation result for the selected choice is displayed.

As shown in FIG. 6A, the sentence input by the user is displayed in the lower part of the display screen, and the choices of examples generated by the choice generating unit 104 in the upper part of the display screen. FIG. 6A shows a case in which the Japanese 601 meaning "No, thank you." in English is input as a source language sentence.

In this case, assume that the parallel corpus as shown in FIG. 2 is stored in the storage unit 111. Then, two choices including the Japanese 602 and the Japanese 603 are proposed through the process described above (step S309).

The user who has input the source language sentence can select an example coincident with the intention of the speaker from the proposed choices through an input device such a pen, a mouse or a keyboard. FIG. 6A shows the manner in which the user has selected the Japanese 602 by pen.

The input receiving unit 101, after receiving the input selected by the user through the input device (step S310), as shown in FIG. 6B, outputs an example "No, thank you." in the target language corresponding to the Japanese 602 on the display unit (step S311).

Figure 7:
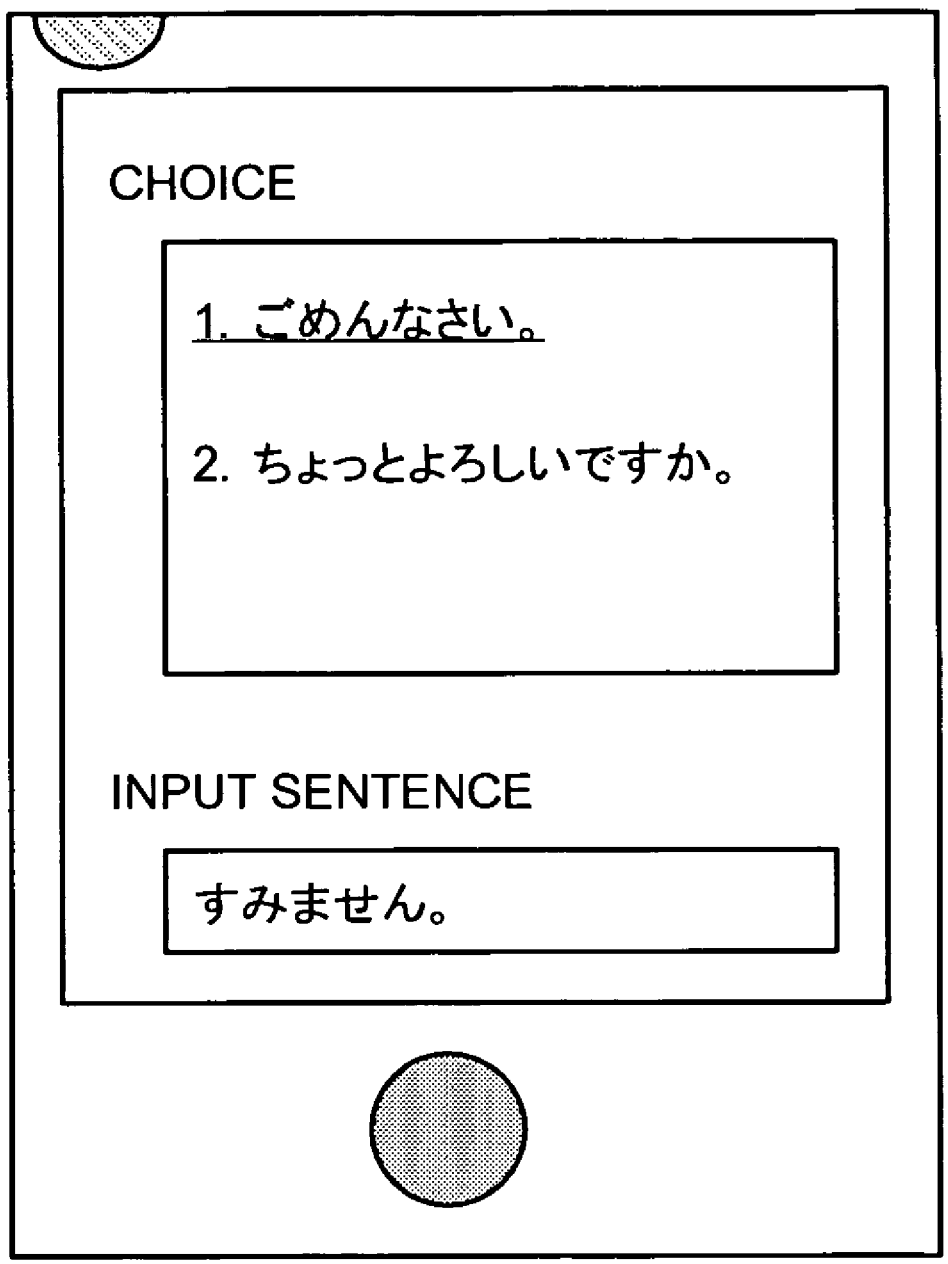
FIG. 7 is a schematic diagram showing another example of the contents of a display screen.

Next, another example of the configuration of the display screen is explained. FIG. 7 is a schematic diagram showing another example of the contents of the display screen.

In the information stored in the storage unit 111, an example, though least in ambiguity, corresponding to a plurality of examples in the target language may be generated as a choice. In such a case, the translation corresponding to the particular example of the source language sentence has an ambiguity, and therefore cannot be proposed as it is as a choice of an example.

In proposing a choice, therefore, an example as a choice extracted by the choice generating unit 104 may be displayed in correspondence with the information as to whether the translation of the particular example has an ambiguity or not.

FIG. 7 shows a case in which the example of the source language sentence of which the corresponding translation has an ambiguity is distinguished from the example free of ambiguity by being underlined. The display method is not limited to this, but any display method may be used in which the information indicating the presence of a plurality of translation examples output in related form.

The corresponding example may alternatively be identified by a symbol other than the underline, or the color of the character or the background of the corresponding example may be changed for identification. Also, the examples for which the corresponding translation has an ambiguity and those for which the translation has no ambiguity may be formed into different groups and separately displayed in different display columns.

Although the above-mentioned case uses the method proposed herein for the portable terminal having a display and an input device, the method proposed can be used also for other types of devices such as a mobile phone or a desktop terminal as well.

As described above, the example-based translation apparatus according to the first embodiment operates in such a manner that when there are a plurality of examples of translation in the input source language sentence, an example with the least ambiguity can be proposed to the user as a choice from among a plurality of examples of the source language sentence corresponding to each example of translation. The user can confirm and select an example conforming to the intention of the speech from choices of an example having a similar meaning to the input sentence, and therefore can easily determine an appropriate example. As a result, the liability to output a translation departing from the intention of the speech of the user is reduced.

In the example-based translation apparatus according to a second embodiment, a plurality of translation examples having the same meaning are collectively stored as one example group which is regarded as one example and processed.

The second embodiment is different from the first embodiment in the configuration of the storage unit. The other parts of the configuration and functions are similar to those of the configuration of the example-based translation apparatus according to the first embodiment shown in the block diagram of FIG. 1, and therefore, being designated by the same reference numerals, respectively, not explained again.

The storage unit 111 according to the second embodiment, like in the first embodiment, is for storing the parallel corpus. The storage unit 111 is different from the corresponding one of the first embodiment in that a plurality of translation examples having the same meaning set in correspondence with an example of the source language sentence are collectively stored as one example group.

Figure 8:
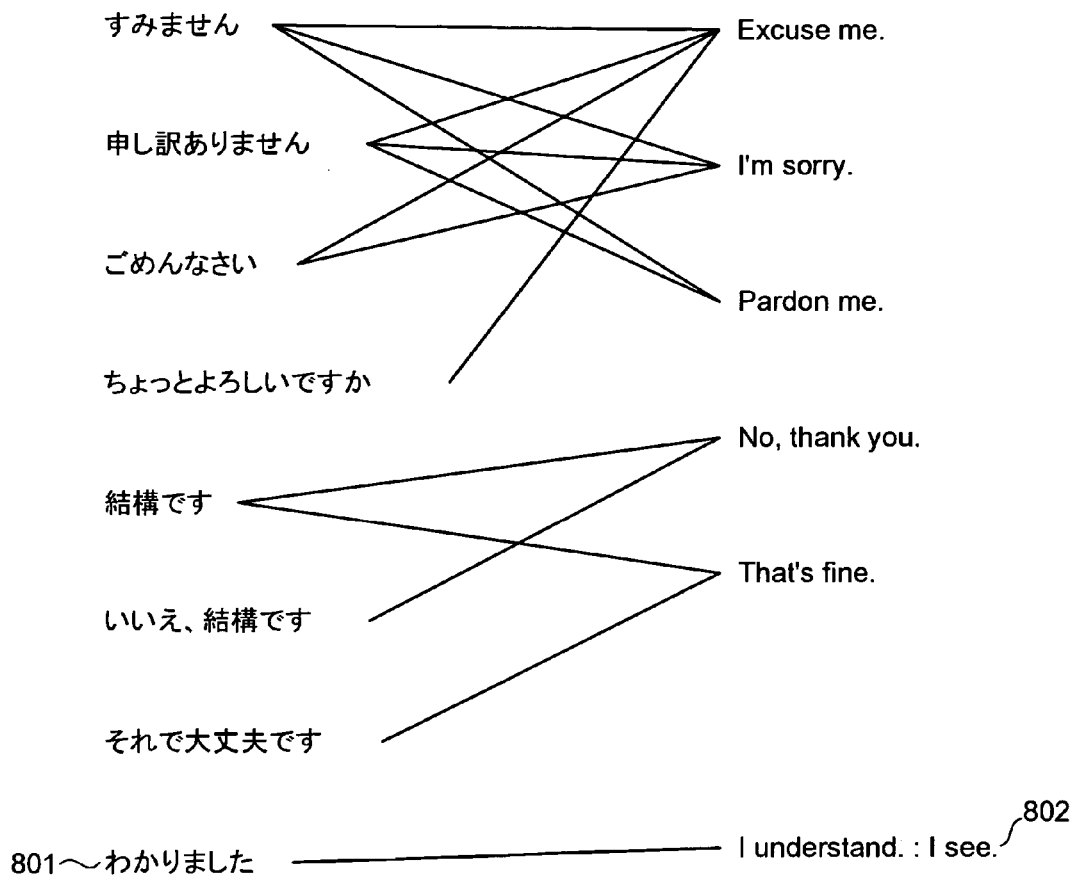
FIG. 8 is a schematic diagram illustrating an example of the data structure of a parallel corpus stored in the storage unit.

FIG. 8 is a diagram schematically showing an example of the data structure of the parallel corpus stored in the storage unit 111. As shown in FIG. 8, there are two examples of English translation "I understand." and "I see." having the same meaning corresponding to the Japanese example 801, and these two English examples are separated by ":" and collectively stored as shown by the English example 802.

Specifically, unlike in the first embodiment, English examples having the same meaning are not stored as independent examples set in correspondence with each other by different straight lines, but stored as a group using a single straight line.

By collectively handling a plurality of examples having the same meaning in this way, the inconvenience of executing the unrequired process is avoided. According to the first embodiment, for example, examples having the same meaning are stored separately in corresponding relation, and therefore step S305 determines that the corresponding example of the source language sentence has an ambiguity and the choice generating process is executed (step S307).

By handling a group of examples having the same meaning in the same way as the other examples according to the second embodiment, in contrast, step S305 determines that the corresponding example of the source language sentence has no ambiguity, and therefore the execution of the choice generating process is avoided.

Excepting that a plurality of examples are handled as one example as described above, the general flow of the example-based translation process of the example-based translation apparatus according to the second embodiment is the same as that of the flowchart showing a general flow of the example-based translation process according to the first embodiment shown in FIG. 3, and therefore not explained again.

When the user selects an example of source language sentence corresponding to an example group as described above (step S310), the output control unit 105 outputs an arbitrary one of the plurality of the examples included in the example group as a translation (step S311).

As described above, in the example-based translation apparatus according to the second embodiment, a plurality of examples having the same meaning are collectively stored as one example group and processed by regarding it as one example. Therefore, the unrequired portion of the ambiguity detection process and the choice generating process is eliminated.

The example-based machine translation is liable to have a vast amount of data in the parallel corpus. Especially for a portable terminal having a limited storage capacity, therefore, it may be desirable not to store the parallel corpus in the terminal but to acquire the examples managed by an external server through a communication device.

In the example-based translation apparatus according to a third embodiment, examples corresponding to an input source language sentence are retrieved for in an example management server for managing the parallel corpus through a communication unit.

FIG. 9 is a block diagram showing a configuration of an example-based translation apparatus 900 according to the third embodiment. As shown in FIG. 9, the example-based translation apparatus 900 includes a communication unit 912, an input receiving unit 101, an example search unit 102, an ambiguity detection unit 103, a choice generating unit 104 and an output control unit 105. Also, the example-based translation apparatus 900 is connected to an example management server 950 through a network such as the Internet.

The third embodiment is different from the first embodiment in that in the third embodiment, the communication unit 912 is added, and the storage unit 111 is deleted. The remaining parts of the configuration and functions are similar to those of the configuration of the example-based translation apparatus 100 according to the first embodiment shown in the block diagram of FIG. 1 and therefore, being designated by the same reference numerals, respectively, not explained again.

The example management server 950 includes a communication unit 941 and a storage unit 951. The communication unit 941 controls the process of receiving an example search request from the example-based translation apparatus 900 and returning an example constituting the search result to the example-based translation apparatus 900.

The storage unit 951, like in the first embodiment, stores the parallel corpus and has the same structure as the storage unit 111 according to the first embodiment. Therefore, the storage unit 951 is not explained again.

The communication unit 912 of the example-based translation apparatus 900 transmits a source language sentence to the example management server 950, and receives the example searched for and returned by the example management server 950 in respect of the transmitted source language sentence.

Next, the example-based translation process executed by the example-based translation apparatus 900 according to the third embodiment having this configuration is explained. FIG. 10 is a flowchart showing a general flow of the example-based translation process according to the third embodiment.

The input receiving process of step S1001 is similar to the process of step S301 in the example-based translation apparatus 100 according to the first embodiment and therefore not explained again.

After receiving the input sentence, the example search unit 102 acquires an example of the source language sentence coincident or analogous to the input sentence from the example management server 950 through the communication unit 912 (step S1002).

The ambiguity detection process, the choice generating process and the output process of steps S1003 to S1011 are similar to the processes of steps S303 to S311 in the example-based translation apparatus 100 according to the first embodiment, and therefore not explained again.

Next, the choice generating process executed by the example-based translation apparatus 900 according to the third embodiment having this configuration is explained. FIG. 11 is a flowchart showing a general flow of the choice generating process according to the third embodiment.

The unprocessed example selection process of step S1101 is similar to the process of step S401 in the example-based translation apparatus 100 according to the first embodiment and therefore not explained again.

After selecting an unprocessed example, the choice generating unit 104 acquires, from the example management server 950 through the communication unit 912, that one of the examples in the source language corresponding to the selected unprocessed translation example which is associated with the least number of examples of translation to the target language (step S1102).

The choice generating process and the completion determining process of steps S1103 to S1104 are similar to those of steps S403 to S404 in the example-based translation apparatus 100 according to the first embodiment and therefore not explained again.

As described above, in the example-based translation apparatus according to the third embodiment, an example corresponding to the input source language sentence can be searched for, through the communication unit, from the example management server for managing the parallel corpus. As a result, the example management process can be concentrated at the example management server, and therefore the example management processing load is reduced.

An example-based translation program executed by the example-based translation apparatus according to the first to third embodiments is provided in the form built in a ROM (read-only memory).

The example-based translation program executed by the example-based translation apparatus according to the first to third embodiments may alternatively be provided in the form recorded as an installable or executable file in a computer-readable recording medium such as a CD-ROM (compact disk read-only memory), a flexible disk (FD), a CD-R (compact disk recordable) or a DVD (digital versatile disk).

As another alternative, the example-based translation program executed by the example-based translation apparatus according to the first to third embodiments may be provided in the form stored in a computer connected to a network such as the Internet and adapted to be downloaded through the network. As still another alternative, the example-based translation program executed by the example-based translation apparatus according to the first to third embodiments may be provided or distributed through a network such as the Internet.

The example-based translation program executed by the example-based translation apparatus according to the first to third embodiments has a modular configuration including the aforementioned various parts (the input receiving unit, the example search unit, the ambiguity detection unit, the choice generating unit, the output control unit), and as actual hardware, a CPU (central processing unit) reads the example-based translation program from the ROM and executes it so that the various parts described above are loaded onto and generated on the main memory.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An example-based translation apparatus comprising:
    a storage unit that stores source examples of a source language and target examples of a target language in a many-to-many relationship meaning that each of the source examples is associated with one or more of the target examples having the same or similar meaning, and each of the target examples is associated with one or more of the source examples having the same or similar meaning;
    an input receiving unit that receives an input of a sentence in the source language;
    a source example search unit that searches the storage unit to identify one or more of the source examples based on the sentence in the source language;
    a target example search unit that, for each of the first source examples, searches the storage unit to identify one or more of the target examples that have similar meanings as the identified first source example;
    a determining unit that determines whether there are a plurality of identified target examples;
    a first acquisition unit that, for each of the identified target examples, acquires from the storage unit one or more second source examples that correspond to the identified target example, when there are the plurality of identified target examples;
    a second acquisition unit that, for each of the second source examples, acquires from the storage unit one or more target examples that correspond to the second source example;
    a choice generating unit that chooses one of the second source examples that is associated with the fewest number of the acquired target examples; and
    an output control unit that outputs the chosen second source example.

2. The example-based translation apparatus according to claim 1,
    wherein the source example search unit searches the storage unit to identify one or more of the first source examples that are coincident with the sentence of the source language.

3. The example-based translation apparatus according to claim 1,
    wherein the source example search unit searches the storage unit to identify one or more of the first source examples of which the degree of analogy to the sentence of the source language is larger than a predetermined threshold value.

4. The example-based translation apparatus according to claim 1,
    wherein the output control unit outputs information indicating the presence of the plurality of the acquired target examples, when the chosen second source example is associated with the plurality of the acquired target examples.

5. The example-based translation apparatus according to claim 4,
    wherein the output control unit underlines the chosen second source example, when the chosen second source example is associated with a the plurality of the acquired target examples.

6. The example-based translation apparatus according to claim 4,
    wherein the output control unit outputs an additional chosen second source example corresponding to a single target example, and outputs the additional chosen second source example separately from the chosen second source example.

7. The example-based translation apparatus according to claim 1,
    wherein when there are a plurality of second source examples associated with the fewest number of the identified target examples, the choice generating unit chooses one of the plurality of second source examples based on a predetermined order of priority.

8. The example-based translation apparatus according to claim 1, further comprising a speech recognition unit that receives speech in the source language, recognizes the received speech, and outputs the sentence in the source language.

9. The example-based translation apparatus according to claim 1, further comprising a character recognition unit that receives character information in the source language, recognizes the received character information, and outputs the sentence in the source language.

10. The example-based translation apparatus according to claim 1, further comprising a display unit that displays the chosen second source example,
wherein the output control unit outputs the chosen second source example to the display unit.

11. The example-based translation apparatus according to claim 1, further comprising a speech synthesis unit that synthesizes a sentence in the target language corresponding to the chosen second source example,
wherein the output control unit outputs the synthesized sentence as speech in the target language.

12. The example-based translation apparatus according to claim 1,
wherein when there are a plurality of the source examples that have the same meaning, the storage unit sets the source examples having the same meaning as a source example group, and collectively stores the source example group in association with the target examples,
when there are a plurality of the target examples that have the same meaning, the storage unit sets the target examples having the same meaning as a target example group, and collectively stores the target example group in association with the source examples,
the source example search unit searches the storage unit to identify one of the first source examples or the first source example group;
the target example search unit searches to identify the target examples and the target example group corresponding to the first source example or the first source example group,
the determining unit determines whether there is more than one identified target example or identified target example group,
when the determining unit determines that there is more than one identified target example or target example group, the first acquisition unit acquires a second source example or a second source example group associated with each of the identified target examples or the identified target example groups,
the second acquisition unit acquires a target example or a target example group corresponding to the second source example or the second source example group, and
the choice generating unit chooses the second source example or the second source example group associated with the fewest number of the acquired target examples.

13. The example-based translation apparatus according to claim 1,
wherein the choice generating unit calculates the number of identified target examples associated with the identified source examples, and chooses the source example with the smallest calculated number as a source example to be output.

14. An example-based translation apparatus comprising:
an input receiving unit that receives an input of a sentence in a source language;
a communication unit that transmits the sentence to an example management server connected to the communication unit through a network, the example management server having a storage unit that stores source examples of the source language and target examples of a target language in a many-to-many relationship meaning that each of the source examples is associated with one or more of the target examples having the same or similar meaning, and each of the target examples is associated with one or more of the source examples having the same or similar meaning;
a source example search unit that searches the storage unit of the example management server through the communication unit to identify one or more of the first source examples based on the sentence in the source language;
a target example search unit that, for each of the first source examples, searches the storage unit of the example management server through the communication unit to identify one or more of the target examples that have similar meanings as the first source example;
a determining unit that determines whether there are a plurality of identified target examples;
a first acquisition unit that, for each of the identified target examples, acquires from the storage unit one or more of the second source examples that correspond to the identified target example, when there are the plurality of identified target examples;
a second acquisition unit that, for each of the second source examples, acquires from the storage unit one or more of the target examples that correspond to the second source example;
a choice generating unit that chooses one of the second source examples that is associated with the fewest number of the acquired target examples; and
an output control unit that outputs the chosen second source example.

15. An example-based translation method comprising:
storing source examples of a source language and target examples of a target language in a many-to-many relationship meaning that each of the source examples is associated with one or more of the target examples having the same or similar meaning, and each of the target examples is associated with one or more of the source examples having the same or similar meaning;
receiving an input of a sentence in a source language;
searching the source examples to identify one or more first source examples based on the sentence in the source language;
for each of the source examples, searching the target examples to identify one or more of the target examples that have similar meanings as the first source example;
determining, using a processor, whether there are a plurality of identified target examples;
for each of the identified target examples, acquiring one or more second source examples that correspond to the identified target example, when there are the plurality of identified target examples;
for each of the second source examples, acquiring one or more of the target examples that correspond to the second source example;
choosing one of the second source examples that is associated with the fewest number of the acquired target examples; and
outputting the chosen second source example.

16. An example-based translation method comprising:
receiving an input of a sentence in a source language;
transmitting the sentence to an example management server over a network using a communication unit, the example management server having a storage unit that stores source examples of the source language and target examples of a target language in a many-to-many relationship meaning that each of the source examples is associated with one or more of the target examples having the same or similar meaning, and each of the target examples is associated with one or more of the source examples having the same or similar meaning;

searching the storage unit of the example management server through the communication unit to identify one or more of first source examples based on the sentence in the source language;

for each of the first source examples, searching the storage unit of the example management server through the communication unit to identify one or more of the target examples that have similar meanings as the first source example;

determining whether there are a plurality of identified target examples;

for each of the identified target examples, acquiring one or more second source examples that correspond to the identified target example, when there are the plurality of identified target examples;

for each of the second source examples, acquiring one or more of the target examples that correspond to the second source example;

choosing one of the second source examples that is associated with the fewest number of the acquired target examples; and outputting the chosen second source example.

17. A computer program tangibly embodied on a computer-readable recording medium including programmed instructions for example-based translation, wherein the instructions, when executed by a computer, cause the computer to perform:

storing source examples of a source language and target examples of a target language in a many-to-many relationship meaning that each of the source examples is associated with one or more of the target examples having the same or similar meaning, and each of the target examples is associated with one or more of the source examples having the same or similar meaning;

receiving an input of a sentence in a source language;

searching the source examples to identify one or more first source examples based on the sentence in the source language;

for each of the first source examples, searching the target examples to identify one or more of the target examples that have similar meanings as the first source example;

determining whether there are a plurality of identified target examples;

for each of the identified target examples, acquiring one or more of second source examples that correspond to the identified target example, when there are a the plurality of identified target examples;

for each of the second source examples, acquiring one or more of the target examples that correspond to the second source example;

choosing one of the second source examples that is associated with the fewest number of the acquired target examples; and outputting the chosen second source example.

18. A computer program product tangibly embodied on computer-readable recording medium including programmed instructions for example-based translation, wherein the instructions, when executed by a computer, cause the computer to perform:

receiving an input of a sentence in a source language;

transmitting the sentence to an example management server over a network using a communication unit, the example management server having a storage unit that stores source examples of the source language and target examples of a target language in a many-to-many relationship meaning that each of the source examples is associated with one or more of the target examples having the same or similar meaning, and each of the target examples is associated with one or more of the source examples having the same or similar meaning;

searching the storage unit of the example management server through the communication unit to identify one or more of first source examples based on the sentence in the source language;

for each of the first source examples, searching the storage unit of the example management server through the communication unit to identify one or more of the target examples that have similar meanings as the first source example:

determining whether there are a plurality of identified target examples;

for each of the identified target examples, acquiring one or more of second source examples that correspond to the identified target example, when there are the plurality of identified target examples;

for each of the second source examples, acquiring one or more of the target examples that correspond to the second source example;

choosing one of the second source examples that is associated with the fewest number of the acquired target examples; and outputting the chosen second source example.

* * * * *